(12) United States Patent
Zhao et al.

(10) Patent No.: US 8,874,524 B1
(45) Date of Patent: Oct. 28, 2014

(54) HANDLING COPY ON FIRST WRITE DATA FOR SNAPSHOT PURPOSES

(75) Inventors: Junping Zhao, Beijing (CN); Ivan Bassov, Brookline, MA (US); Kevin Xu, Warren, NJ (US); Gang Xie, Beijing (CN); Jialin Yang, Beijing (CN); Wei Qi, Beijing (CN)

(73) Assignee: EMC Corporation, Hopkinton, MA (US)

( * ) Notice: Subject to any disclaimer, the term of this patent is extended or adjusted under 35 U.S.C. 154(b) by 315 days.

(21) Appl. No.: 13/530,503

(22) Filed: Jun. 22, 2012

(51) Int. Cl.
*G06F 7/00* (2006.01)
*G06F 17/30* (2006.01)

(52) U.S. Cl.
CPC ...... *G06F 17/30088* (2013.01); *G06F 2201/84* (2013.01)
USPC ........... 707/657; 707/639; 707/649; 711/118; 711/162

(58) Field of Classification Search
CPC ....................... G06F 2201/84; G06F 17/30088
USPC .................... 707/639, 649, 657; 711/118, 162
See application file for complete search history.

(56) References Cited

U.S. PATENT DOCUMENTS

| | | | |
|---|---|---|---|
| 7,155,586 B1 | 12/2006 | Wagner et al. | |
| 7,159,085 B2 | 1/2007 | Wagner et al. | |
| 7,206,863 B1 | 4/2007 | Oliveira et al. | |
| 7,216,264 B1 | 5/2007 | Glade et al. | |
| 7,225,317 B1 | 5/2007 | Glade et al. | |
| 7,266,652 B1 | 9/2007 | Hotle et al. | |
| 7,299,332 B1 | 11/2007 | Misra et al. | |
| 7,315,914 B1 | 1/2008 | Venkatanarayanan et al. | |
| 7,370,235 B1 | 5/2008 | Gulve et al. | |
| 7,380,059 B2 * | 5/2008 | Burton ........................... | 711/113 |
| 7,401,251 B1 | 7/2008 | Haynes et al. | |
| 7,509,465 B1 | 3/2009 | Misra et al. | |
| 7,509,535 B1 | 3/2009 | Gulve et al. | |
| 7,617,372 B1 | 11/2009 | Bjornsson et al. | |
| 7,620,774 B1 | 11/2009 | Waxman | |
| 7,620,775 B1 | 11/2009 | Waxman | |
| 7,716,183 B2 * | 5/2010 | Lee ............................... | 707/639 |
| 7,739,448 B1 | 6/2010 | Oliveira et al. | |
| 7,770,059 B1 | 8/2010 | Glade et al. | |
| 7,783,798 B1 | 8/2010 | Misra et al. | |
| 7,818,517 B1 | 10/2010 | Glade et al. | |
| 7,831,682 B2 * | 11/2010 | Certain et al. ................ | 709/214 |
| 7,849,262 B1 | 12/2010 | Glade et al. | |
| 7,865,677 B1 | 1/2011 | Duprey et al. | |
| 7,882,068 B2 * | 2/2011 | Schack et al. ................. | 707/639 |
| 7,958,305 B1 | 6/2011 | Oliveira et al. | |
| 7,975,115 B2 * | 7/2011 | Wayda et al. ................. | 711/162 |
| 7,984,253 B1 | 7/2011 | Glade et al. | |

(Continued)

*Primary Examiner* — Cheyne D Ly
(74) *Attorney, Agent, or Firm* — BainwoodHuang

(57) ABSTRACT

A technique performs a write operation. The technique involves receiving, after a snapshot of a file system is taken, a write instruction to write new data to a particular portion of the file system. The technique further involves includes reading, in response to the write instruction, metadata to determine whether the new data is a first update of the particular portion since the snapshot was taken. The metadata identifies portions of the file system which have changed since the snapshot was taken. The technique further involves, when the new data is a first update of the particular portion since the snapshot was taken, copying the original data from cache memory (i.e., from the file system buffer cache) to snapshot storage (i.e., to a dedicated save area) and, after the original data is copied, updating the original data in the cache memory with the new data.

15 Claims, 5 Drawing Sheets

(56) References Cited

U.S. PATENT DOCUMENTS

| | | |
|---|---|---|
| 7,992,038 B1 | 8/2011 | Glade et al. |
| 8,032,701 B1 | 10/2011 | Glade et al. |
| 8,117,410 B2 * | 2/2012 | Lu et al. ................ 711/162 |
| 8,127,307 B1 | 2/2012 | Palekar et al. |
| 8,219,681 B1 | 7/2012 | Glade et al. |
| 8,260,744 B1 * | 9/2012 | Chatterjee et al. ............ 707/639 |
| 8,307,174 B1 | 11/2012 | Misra et al. |
| 8,615,641 B2 * | 12/2013 | Sampathkumar ............. 711/162 |
| 2006/0265568 A1 * | 11/2006 | Burton ......................... 711/216 |
| 2011/0119234 A1 * | 5/2011 | Schack et al. ................. 707/639 |
| 2011/0184912 A1 * | 7/2011 | Baptist et al. ................ 707/639 |

* cited by examiner

US 8,874,524 B1

HANDLING COPY ON FIRST WRITE DATA FOR SNAPSHOT PURPOSES

BACKGROUND

A computer system is capable of employing a variety of data protection technologies such as snapshot and mirroring functionality. A snapshot is not a full copy of a production volume. Rather, a snapshot includes only original portions of the production volume which have changed since the snapshot was taken, i.e., Copy on First Write (CoFW) data. On the other hand, a mirror is a full copy of a production volume, i.e., a byte-by-byte real time copy of the production volume.

Examples of snapshot-related products include SnapSure™ and SnapView™ both of which are provided by EMC Corporation of Hopkinton, Mass. An example of a mirroring product is MirrorView™ which is also provided by EMC Corporation of Hopkinton, Mass.

In connection with conventional snapshots, suppose that an original data block of a particular production volume requires updating on a computer system. Along these lines, when the processor of the computer system receives an instruction to modify the original data block of the particular production volume (e.g., a write instruction, a read-modify-write instruction, etc.), the processor allocates memory and then reads the original data block of the particular production volume (as CoFW data) from disk synchronously into the allocated memory. Such reading of the original data block from disk takes place even if the original data block already resides in the buffer cache of the computer system due to an earlier read IO.

SUMMARY

Unfortunately, the above-described conventional snapshot approach may be a source of inefficiency and may impact performance of normal file system operations. For example, the above-described conventional snapshot approach generates extra IOs. That is, even if the original portion of the particular production volume already resides in the buffer cache (e.g., due to an earlier read IO), the processor nevertheless reads the original data block of the particular production volume from disk synchronously into the allocated memory.

In contrast to the above-described conventional snapshot approach which reads CoFW data from disk regardless of whether the CoFW data already resides in the buffer cache, an improved technique for handling CoFW data for snapshot purposes involves locating CoFW data in cache memory (e.g., in the file system buffer cache using a standard hashing mechanism) and simply copying the CoFW data from the cache memory to a save area for snapshot purposes. That is, the technique involves quickly identifying the CoFW data in the file system buffer cache and passing the CoFW data from the file system buffer cache to the snapshot save area. Such operation eliminates the extra IO (i.e., reading the CoFW data from disk) by leveraging off of user access patterns and the file system buffer cache. Moreover, such operation achieves better snapshot throughput and does not compromise data consistency.

One embodiment is directed to a method of performing a write operation. The method includes receiving, after a snapshot of a file system is taken, a write instruction to write new data to a particular portion of the file system. The method further includes reading, in response to the write instruction, metadata to determine whether the new data is a first update of the particular portion of the file system since the snapshot was taken. The metadata identifies portions of the file system which have changed since the snapshot was taken. The method further includes, when the metadata indicates that the new data is not a first update of the particular portion since the snapshot was taken, updating original data in cache memory (e.g., in the file system buffer cache) with the new data, the original data corresponding to the particular portion of the file system. The method further includes, when the metadata indicates that the new data is a first update of the particular portion since the snapshot was taken, copying the original data from the cache memory to snapshot storage (e.g., a dedicated save area) which is separate from the cache memory and, after the original data is copied from the cache memory to the snapshot storage, updating the original data in the cache memory with the new data.

In some arrangements, the portions of the file system are data blocks (e.g., aligned 8 KB portions of data), and the metadata includes a snapshot bitmap having a set of bitmap entries. Each bitmap entry corresponds to a respective data block of the file system. In these arrangements, the write instruction identifies a particular data block, and reading the metadata to determine whether the new data is a first update of the particular portion includes reading, from the snapshot bitmap, contents of a particular bitmap entry corresponding to the particular data block identified by the write instruction. When the contents of the particular bitmap entry define a first value (e.g., bit="1"), the new data is not a first update of the particular portion since the snapshot was taken (i.e., a CoFW situation does not exist). However, when the contents of the particular bitmap entry define a second value which is different than the first value (e.g., bit="0"), the new data is a first update of the particular portion since the snapshot was taken (i.e., a CoFW situation exists).

In some arrangements, the metadata further includes a snapshot blockmap having a set of blockmap entries. Each blockmap entry corresponds to a respective data block of the file system. In these arrangements, the method further includes storing, in response to copying the original data from the cache memory to the snapshot storage, a pointer in a particular blockmap entry corresponding to the particular data block identified by the write instruction. The pointer is an address of the snapshot storage which stores the original data copied from the cache memory (e.g., the snapshot "SavVol").

Other embodiments are directed to systems, apparatus, processing circuits, computer program products, and so on. Some embodiments are directed to various methods, electronic components and circuitry which are involved in handling CoFW data for snapshot purposes.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques for handling Copy on First Write (CoFW) data for snapshot purposes involve locating an original portion of a file system in cache memory (e.g., the file system buffer cache) and simply copying the original portion from the cache memory to a save area for snapshot purposes. That is, the techniques involve quickly identifying the original portion in the file system buffer cache and passing that original portion from the file system buffer cache to the save area. Such operation eliminates an extra IO (i.e., reading the original portion of the file system from disk memory) by leveraging off of user access patterns and the file system buffer. Moreover, such operation achieves better snapshot throughput and does not compromise data consistency. Accordingly, snap performance increases significantly by reducing one disk read IO for every snapped portion (e.g., for every original data block copied to the save area).

Figure 1:
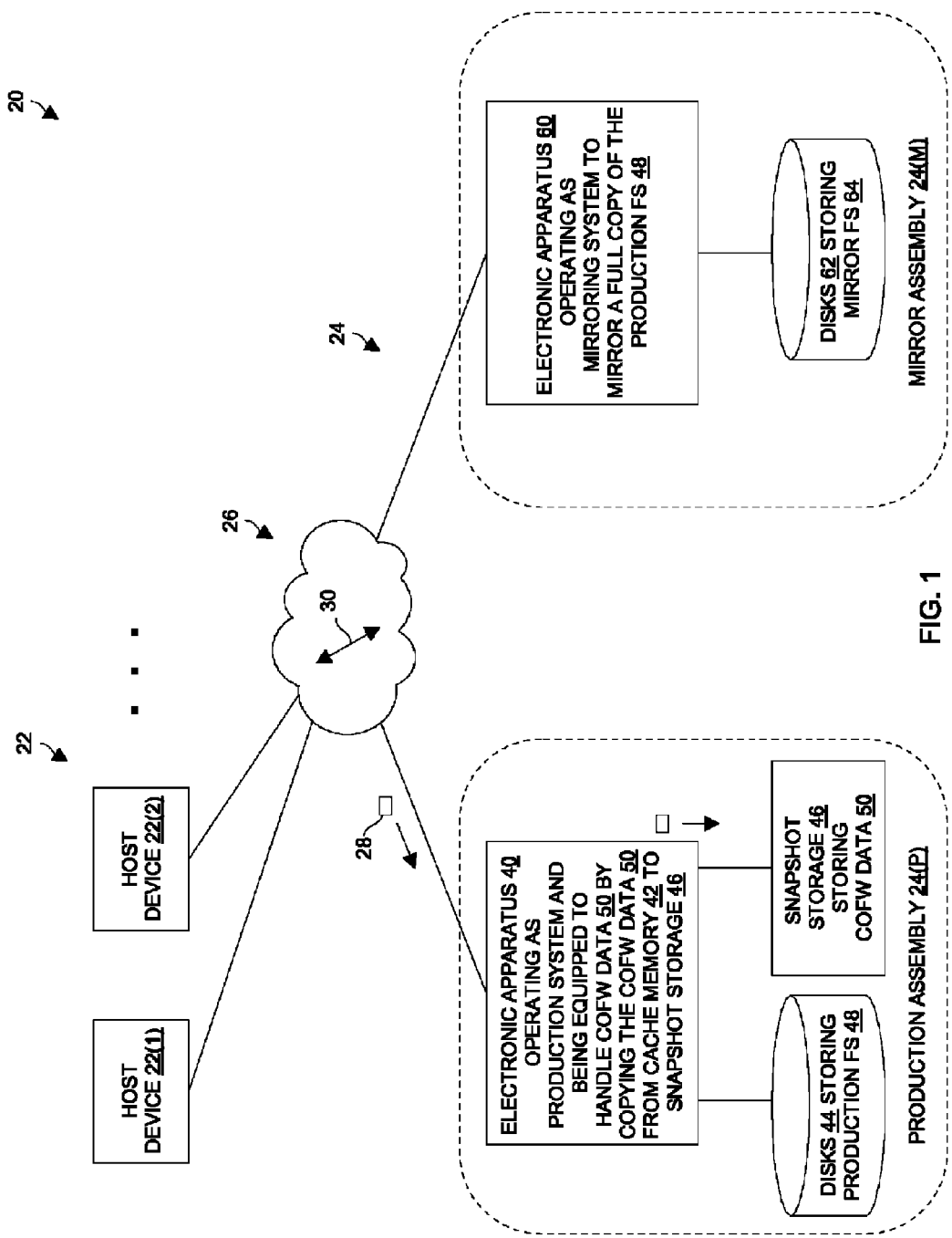
FIG. 1 is a block diagram of an electronic system which handles Copy on First Write (CoFW) data for snapshot purposes by copying original data from cache memory to a save area thus eliminating re-copying the original data from disk.

FIG. 1 shows an electronic system 20 which handles CoFW data by locating the CoFW data in cache memory and copying that CoFW data to a save area to eliminate an extra read IO from disk. The electronic system 20 includes host devices 22(1), 22(2), . . . (collectively, host devices 22), production assembly 24(P) and mirror assembly 24(M) (collectively, storage assemblies 24), and communications medium 26.

The host devices 22 are constructed and arranged to store data into and load data from the storage assemblies 24. Along these lines, each host device 22 is capable of providing IO instructions 28 to the storage assemblies 24 (e.g., read IOs and write IOs in the form of SCSI commands, iSCSI commands, etc.).

The storage assemblies 24 are constructed and arranged to process the IO instructions 28 from the host devices 22. For example, when host data is written to or modified on the production assembly 24(P), the changes are mirrored by the mirror assembly 24(M) (and perhaps vice versa). As a result, the storage assemblies 24 provide high availability, e.g., the storage assemblies 24 provide fault tolerance, load balancing, etc.

The communications medium 26 connects the various components of the electronic system 20 together to enable these components to exchange electronic signals 30 (e.g., see the double arrow 30). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

The production assembly 24(P) includes an electronic apparatus 40 having internal cache memory 42 (e.g., a dedicated part of semiconductor-based main memory which forms a buffer cache), disk storage 44 (e.g., an array of magnetic disks dedicated to volume storage) and snapshot storage 46 (e.g., snapshot save area memory which is separate from the buffer cache and volume storage). The disk storage 44 stores a production file system 48 (e.g., one or more volumes) which is made available to the host devices 22. The snapshot storage 46 stores CoFW data 50 in the event a snapshot must be restored. This CoFW data 50 is original data of the production file system 48 that existed at the time the snapshot was taken, and that is saved in the snapshot storage 46 when the original data of the production file system 48 is updated with new data.

It should be understood that the disk storage 44 and the snapshot storage 46 are shown in FIG. 1 as being external to the electronic apparatus 40 by way of example only. The disks 44 may be internal to the electronic apparatus 40 (e.g., local disks of a storage server) or external to the electronic apparatus 40 (e.g., in a separate data storage array). Similarly, the snapshot storage 46 (e.g., disk memory, semiconductor memory, etc.) may be internal to the electronic apparatus 40 or external to the electronic apparatus 40.

It should be further understood that the mirror assembly 24(M) may be provisioned in a manner similar to that of the production assembly 24(P) (e.g., for business continuity). However, for illustration purposes, the mirror assembly 24(M) is shown as simply including an electronic apparatus 60 and disk memory 62 to operate as a remote mirroring site with respect to the production assembly 24(P). That is, the mirror assembly 24(M) maintains a mirror file system 64 to mirror the production file system 48 of the production assembly 24(P). In some arrangements, the production assembly 24(P) and the mirror assembly 24(M) operate in an active-active manner. In other arrangements, the production assembly 24(P) and the mirror assembly 24(M) operate in an active-passive manner.

During operation of the electronic system 20, the production assembly 24(P) is equipped to take snapshots in response to snapshot commands from a user (e.g., a system administrator). For example, the user may anticipate the possible need to quickly restore the production file system 48 to an earlier point in time and thus direct the production assembly 24(P) to take a snapshot of the production file system 48.

When the snapshot is taken, the electronic apparatus 40 of the production assembly 24(P) creates snapshot metadata to manage snapshot data for a potential restore. Although no data is immediately copied from the production file system 48 in response to the snapshot command, the electronic apparatus 40 of the production assembly 24(P) is now ready to copy original data of the production file system 48 as needed and before that original data is modified by the host devices 22.

After the snapshot is taken, suppose that the production assembly 24(P) receives a write instruction 28 to change particular portion of the production file system 48. For example, suppose that a host device 22 writes new data to the production assembly 24(P) to modify a particular data block of the production file system 48.

In response to such a write instruction 28, the production assembly 24(P) checks the snapshot metadata to determine whether the new data is the first update of the particular data block. If not, the production assembly 24(P) simply updates the particular data block with the new data.

However, if the metadata indicates that the particular data block is the original data that existed at the time the snapshot was taken and is thus CoFW data 50 (i.e., the particular data block has not changed since the snapshot was taken), the production assembly 24(P) copies the CoFW data 50 from the cache memory 42 to the snapshot storage 44 without performing an extra read IO from the production file system 44 and updates the metadata. For example, the circuitry of the electronic apparatus 40 may have previously copied the CoFW data 50 into the cache memory 42 from the production file system 48 on disks 44 in response to an earlier read IO.

Alternatively, if the write instruction 28 defines a read-modify-write operation, the circuitry will have recently copied the CoFW data 50 into the cache memory 42 from the production file system 48 as part of the read-modify-write operation. In either situation, there is no additional read IO performed to obtain the CoFW data 50 from the disks 44. Rather, the circuitry of the electronic apparatus 40 simply locates the CoFW data 50 within the cache memory 42 (e.g., utilizing a standard hash algorithm to locate data within the buffer cache due to a cache hit) and copies the located CoFW data 50 from the cache memory 42 to the snapshot storage 46. Accordingly, such operation saves an extra read IO when placing the CoFW data 50 in the snapshot storage 46 for snapshot purposes.

With the CoFW data 50 safely stored in the snapshot storage 46, the user is able to restore the production file system 48 to the earlier state of the snapshot. In particular, the earlier state is simply the combination of the non-modified original data within the production file system 48 and the CoFW data 50 saved in the snapshot storage 46.

Furthermore, since all changes to the production file system 48 are further mirrored to a mirror file system 64 stored on the disks 62 of the mirror assembly 24(M), a copy of the current state of the production file system 48 is accessible for high availability. Accordingly, if the host devices 22 lose access to the production assembly 24(P), the host devices 22 are able to access the mirror file system 64 maintained by the mirror assembly 24(M). Further details will now be provided with reference to FIG. 2.

Figure 2:
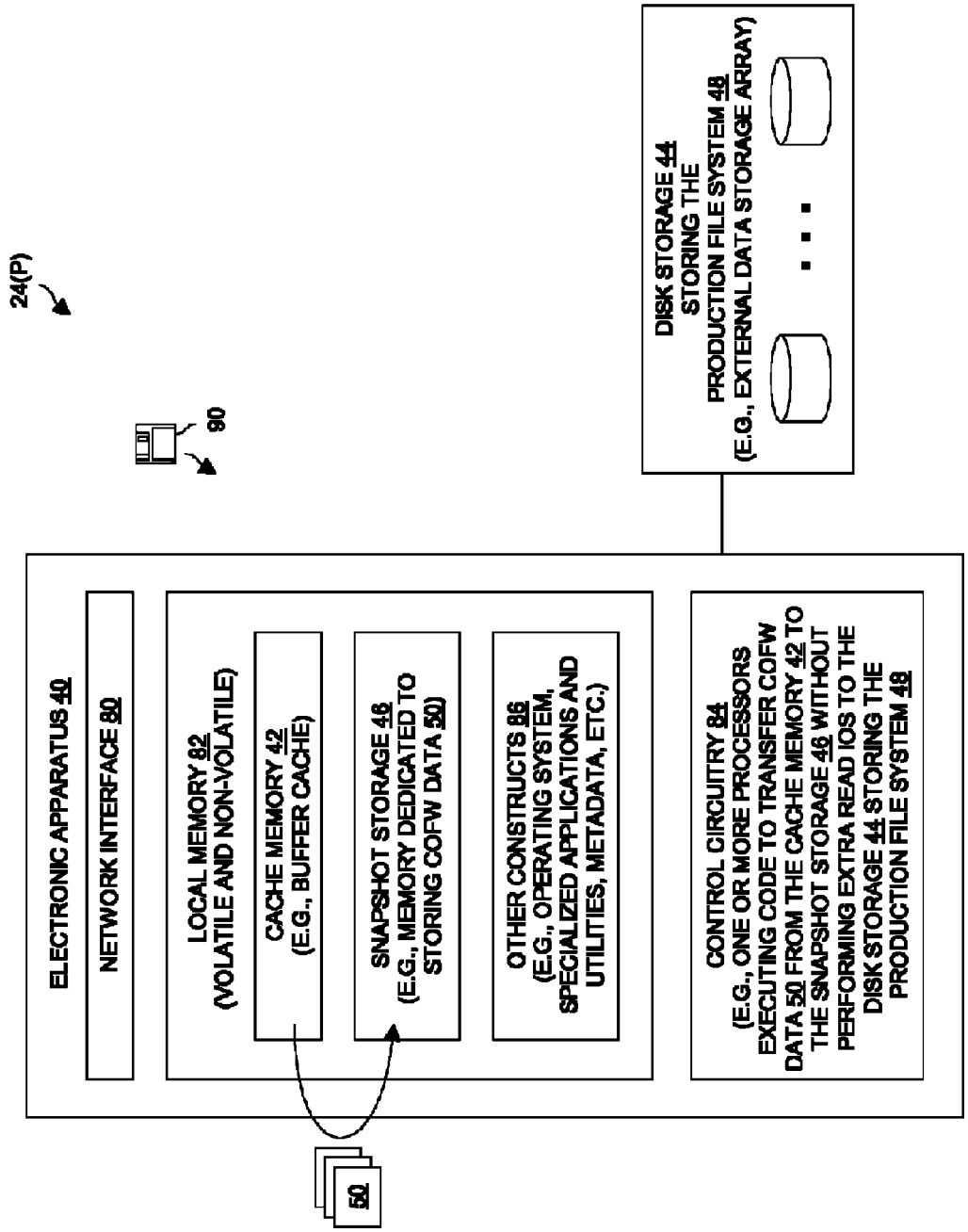
FIG. 2 is a block diagram of particular details of a production assembly of the electronic system of FIG. 1.

FIG. 2 shows particular details of the production assembly 24(P) of the electronic system 20. As shown, the production assembly 24(P) includes the electronic apparatus 40 and the disk storage 44 storing the production file system 48 (also see FIG. 1). As shown in FIG. 2, the electronic apparatus 40 includes a network interface 80, local memory 82 and control circuitry 84.

The network interface 80 is constructed and arranged to connect the electronic apparatus 40 to the communications medium 26. Accordingly, the network interface enables the electronic apparatus 40 to communicate with the other components of the electronic system 20.

The local memory 82 is intended to represent both volatile memory (e.g., semiconductor-based memory) and non-volatile memory (e.g., disk memory) of the electronic apparatus 40. As shown, the local memory 82 includes cache memory 42 (e.g., a buffer cache) for caching host data exchanged between the host devices 22, the snapshot storage 46 (e.g., local disk memory), and additional memory 86 for storing other constructs such as an operating system, specialized applications and utilities, snapshot metadata, etc.

The control circuitry 84 is constructed and arranged to perform load and store operations (i.e., process SCSI commands) on behalf of the host devices 22 (FIG. 1). Additionally, the control circuitry 84 is constructed and arranged to efficiently maintain snapshots of the production file system 48 as well as restore the production file system 48 to the previously taken snapshots.

It should be understood that the control circuitry 84 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 90 is capable of delivering all or portions of the software to the electronic apparatus 40. The computer program product 90 has a non-transitory (or non-volatile) computer readable medium which stores a set of instructions which controls one or more operations of the electronic apparatus 40. Examples of suitable computer readable storage media include tangible articles of manufacture and apparatus which store instructions in a non-volatile manner such as CD-ROM, flash memory, disk memory, tape memory, and the like.

During operation, the electronic apparatus 40 caches portions of the production file system 48 within the cache memory 42 in response to host IO instructions 28 from the host devices 22 (e.g., SCSI read and write commands, also see FIG. 1). During such operation, if the electronic apparatus 40 receives a write instruction 28 to write new data to a portion of the production file system 48 as a first update of that portion since a snapshot of the production file system 48 was taken, the electronic apparatus 40 copies the portion of the production file system 48 from the cache memory 42 to the snapshot storage 46 prior to writing the new data. This portion of the production file system 48, called CoFW data 50, may have been previously copied from the disk storage 44 to the cache memory 42 due to a read IO by a host device 22 or perhaps is copied from the disk storage 44 to the cache memory 42 because the write instruction 28 defines a read-modify-write operation. Regardless, copying the CoFW data 50 from the cache memory 42 to the snapshot storage 46 alleviates the need to re-copy the CoFW data 50 from the disk storage 44 to the snapshot storage 46 for snapshot purposes thus saving an extra disk IO.

It should be understood that legacy equipment can be re-configured with the above-described improvement. In particular, the existing snapshot feature is modified (or retrained) to call the existing efficient hash algorithm which locates host data within the buffer cache (i.e., to determine cache hits) rather than read the CoFW data 50 from disk. As a result, snap performance improves significantly by reducing one disk read IO for every data block which is snapped. Moreover, such improved operation still guarantees data consistency and with no meaningful increase in system memory consumption. Further details will now be provided with reference to FIGS. 3 and 4.

Figure 3:
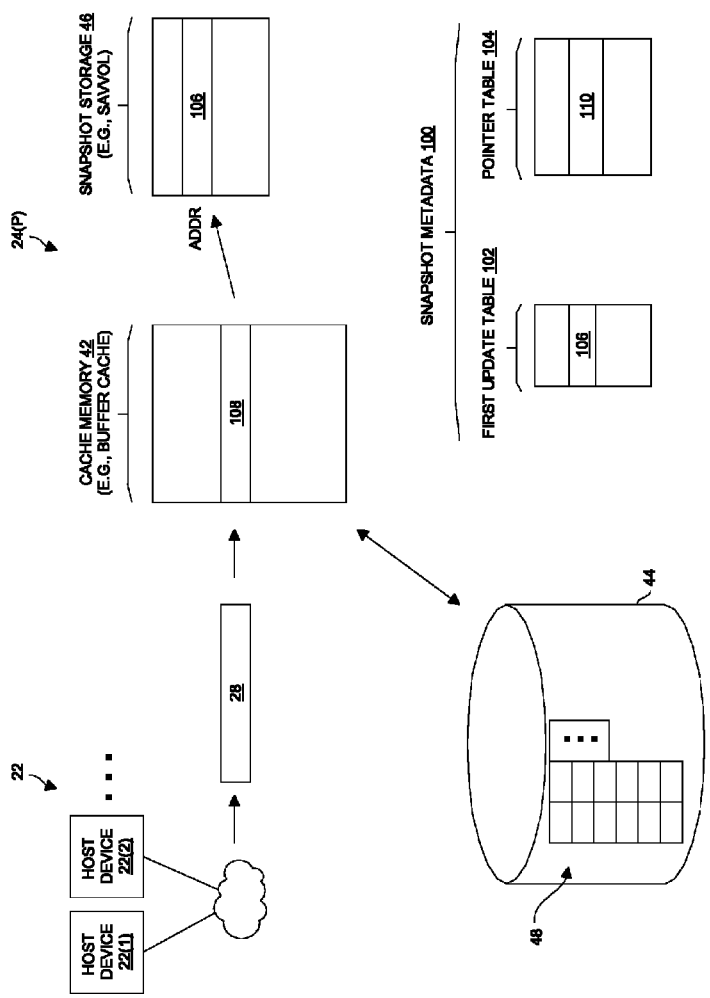
FIG. 3 is a general block diagram of certain data flow details of the electronic system of FIG. 1.
Figure 4:
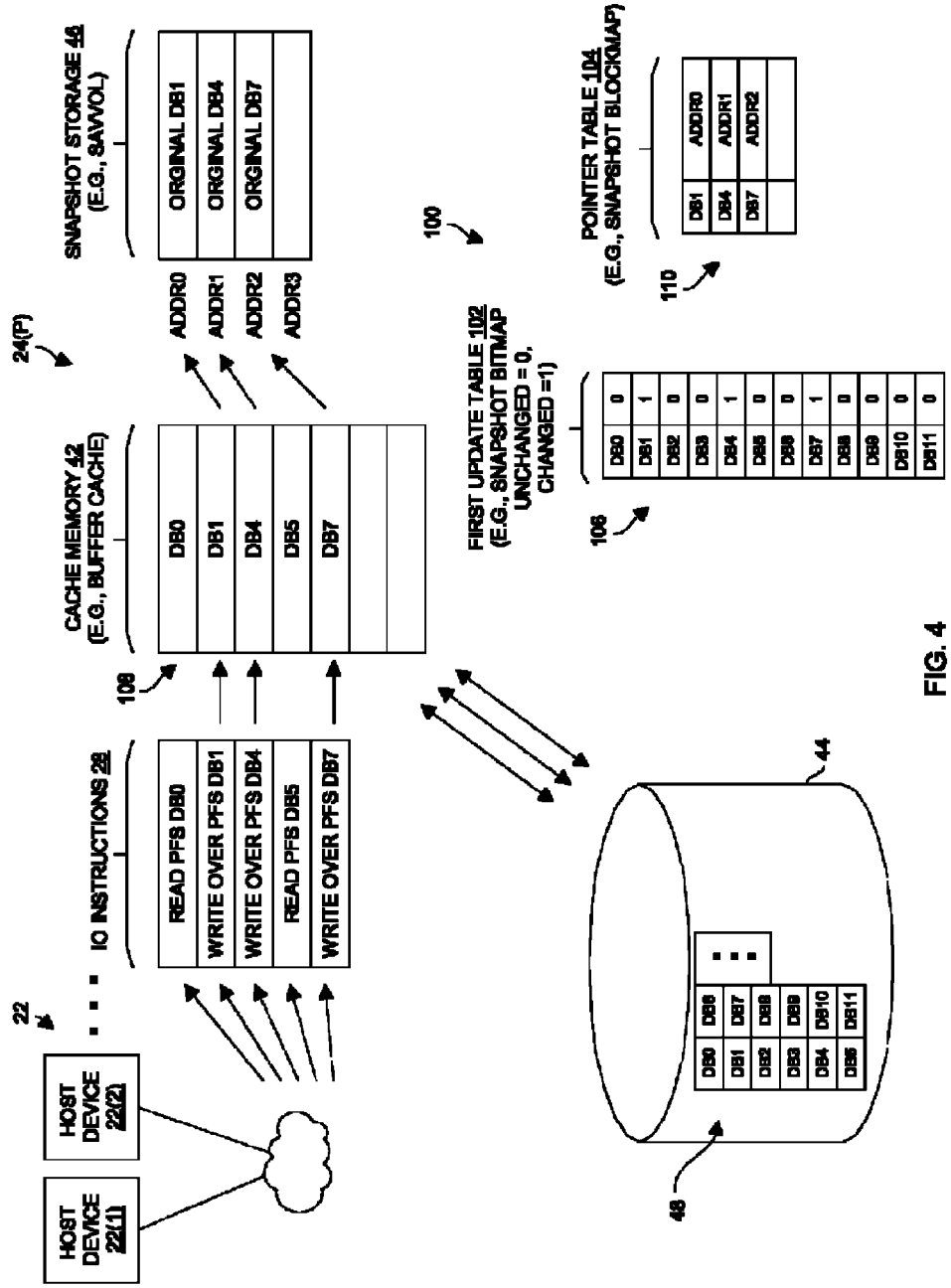
FIG. 4 is a block diagram of an example data flow for the electronic system of FIG. 1.

FIG. 3 shows the general operation of particular components of the production assembly 28(P) during operation. FIG. 4 shows an example operating situation of the production assembly 28(P). As shown in FIGS. 3 and 4, the production file system 48 (shown as data blocks) resides on disk storage 44 (also see FIGS. 1 and 2).

As the electronic apparatus 40 processes IO instructions 28 from the host devices 22, the electronic apparatus 40 moves portions of the production file system 48 between the cache memory 42 and the disk storage 44. For example, a host device 22 may provide a read instruction 28 which causes the control circuitry 84 of the electronic apparatus 40 (FIG. 2) to supply a data block of the production file system 38 to that host device 22 as well as temporarily cache that data block in its buffer cache for another read in the future. As another example, a host device 22 may provide a read-modify-write instruction 28 which causes the control circuitry to copy a data block of the production file system 48 from the disk storage 44 into the cache memory 42 prior to modifying that data block and saving the modified data block onto the disk storage 44.

As shown in FIG. 3, the electronic apparatus 40 has access to snapshot metadata 100 (also see the other constructs 86 in FIG. 2) corresponding to a particular snapshot of the production file system 48. The snapshot metadata 100 includes a first update table 102 and a pointer table 104. The first update table 102 includes entries 106 corresponding to respective blocks of the cache memory 42. The first update table 102, which may be referred to as a snapshot bitmap, indicates which blocks of data within the cache memory 42 are to be treated as CoFW data 50. In particular, each entry 106 of the first update table 102 indicates whether data within a corresponding block of the cache memory 42 holds original data as of when the particular snapshot was taken and which has not been copied to the snapshot storage 46 (e.g., when the value within that entry 106 is "0"), or new data which has replaced original data already copied to the snapshot storage 46 (e.g., when the value within that entry 106 is "1"). If a particular data block in the cache memory 42 is original data which has not yet been copied to the snapshot storage 46, any write instruction 28 to write new data to that data block provides a CoFW situation which requires the original data to be copied to the snapshot storage 46 prior to modification of the original data in the cache memory 42.

By way of example only and with reference to FIG. 4, the entries 106 of the first update table 102 indicate that the data blocks DB1, DB4 and DB7 have already been saved from the cache memory 42 to the snapshot storage 46. Accordingly, other data blocks 110 residing in the cache memory 42 must still be treated as CoFW data 50 and copied from the cache memory 42 to the snapshot storage 46 prior to modification.

As further shown in FIG. 3, the pointer table 104 includes entries 110 which indicate where the CoFW data 50 within the snapshot storage 44 can be found. In particular, each entry 110 stores a pointer (or memory address) to identify how to find the CoFW data 50 within the snapshot storage 46.

By way of example only and with reference to FIG. 4, the entries 110 of the pointer table 104 store pointers to the data blocks DB1, DB4 and DB7 which have been copied from the cache memory 42 to the snapshot storage 46. Accordingly, the control circuitry 84 is able to easily find the CoFW data 50 within the snapshot storage 46 during a snapshot restoration operation.

It should be understood that the control circuitry 84 of the electronic apparatus 40 checks the first update table 100 upon receipt of each write instruction 28 to determine whether new data to be written creates a CoFW situation. If so, the control circuitry 84 copies the original data from the cache memory 42 to the snapshot storage 46 and updates the first update table 102 and the pointer table 104. In particular, the control circuitry 84 changes the value in a first update entry 106 corresponding to the data block in the cache memory 42 (e.g., sets the contents to "1") and updates a pointer entry 110 in the pointer table 104 (e.g., stores a pointer to the snapshot storage 46 so the original data can be retrieved for a snapshot restore in the future). Accordingly, if the control circuitry 84 later needs to restore a snapshot, the control circuitry 84 is able to find the original data in the snapshot storage 46. After the control circuitry 84 copies the original data from the cache memory 42 to the snapshot storage 46, the control circuitry 84 updates the data block in the cache memory 42 with the new data.

It should be understood that there is no re-copying of original data from the disk storage 44 necessary when handling the CoFW situation. Rather, to save the original data in the snapshot storage 46, the original data is found within the cache memory 42 (e.g., via an efficient hash algorithm) and simply copied from the cache memory 42 to the snapshot storage 46. Such operation saves an extra read IO when processing the write instruction 28.

It should be further understood that, if the first update table 102 indicates that the write instruction 28 does not create a CoFW situation, the control circuitry simply updates the cache memory 42 with the new data. Further details will now be provided with reference to FIG. 5.

Figure 5:
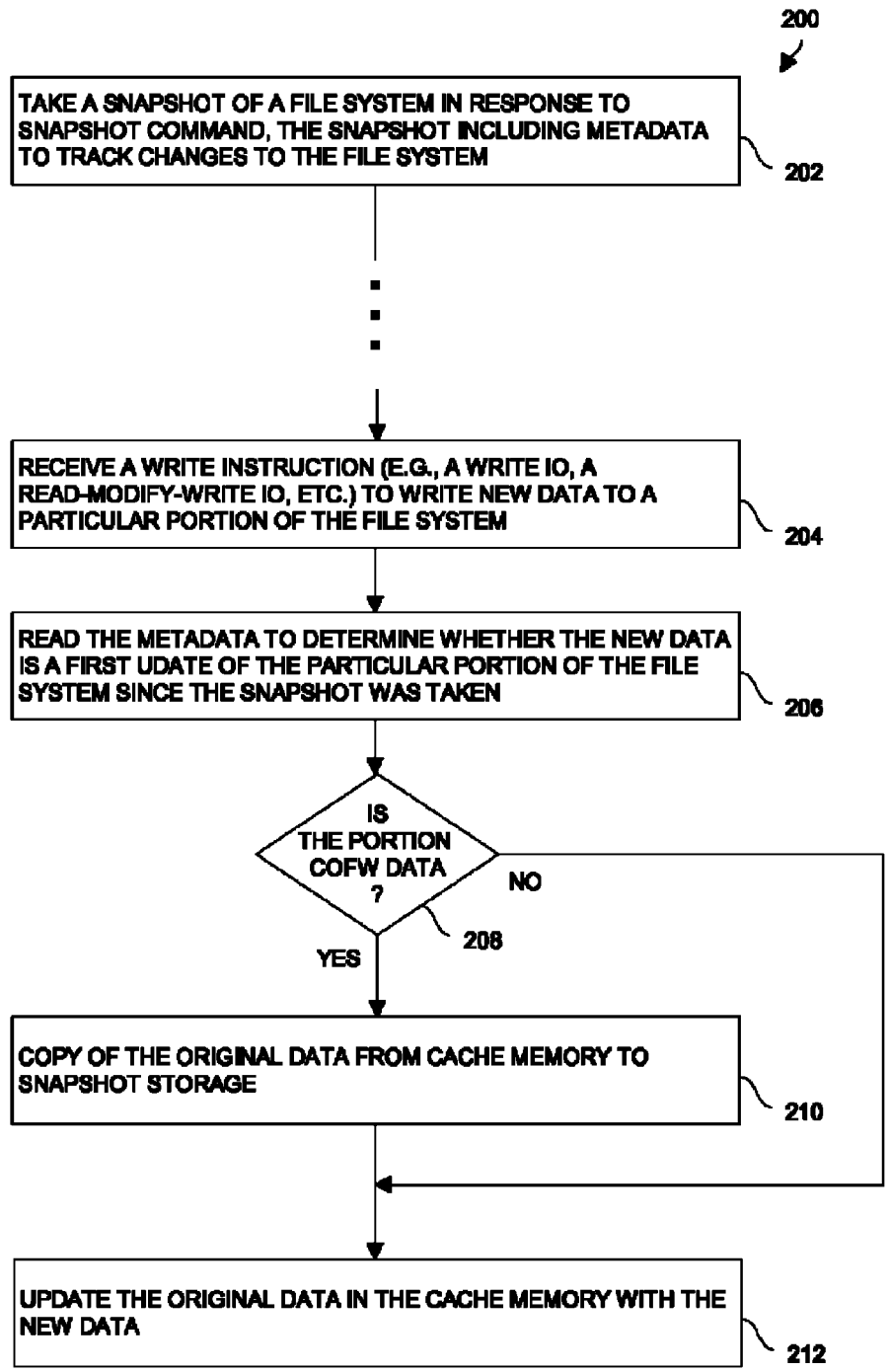
FIG. 5 is a flowchart of a procedure which is performed by the electronic apparatus of FIG. 2.

FIG. 5 is a flowchart of a procedure 200 which is performed by the electronic apparatus 40 while handling CoFW data 50 for snapshot purposes. In step 202, the electronic apparatus 40 takes a snapshot of a file system 48 in response to a snapshot command (e.g., from a user). As mentioned earlier in connection with FIGS. 3 and 4, such operation involves the creation of snapshot metadata 100 which enables the electronic apparatus 40 to track changes to the file system 48 (also see FIGS. 3 and 4).

In step 204 (perhaps after some time has passed), the electronic apparatus 40 receives a write instruction 28 to write new data to a particular portion of the file system 48. For example, the electronic apparatus 40 may receive, from a host device 22 a write instruction 28 to overwrite an original data block which was previously copied to the cache memory 42 (also see FIG. 2). As another example, the electronic apparatus 40 may receive a read-modify-write instruction 28 to update an original data block with the new data.

In step 206, in response to the write instruction 28, the electronic apparatus 40 reads the metadata 100 to determine whether the new data is a first update of the original data block since the snapshot was taken. Recall that, in connection with FIGS. 3 and 4, the control circuitry 84 of the electronic apparatus 40 update the metadata 100 in an ongoing manner.

In step 208, if the electronic apparatus 40 determines that the new data is a first update of the original data block since the snapshot was taken, step 208 proceeds to step 210. Otherwise, if the electronic apparatus 40 determines that the new data is not a first update of the original data block since the snapshot was taken, step 208 proceeds to step 212.

In step 210, the electronic apparatus 40 copies the original data block from the cache memory 42 to the snapshot storage 46. That is, the electronic apparatus 40 treats the original data block as CoFW data 50 for saving in the event of a snapshot restore. However, the electronic apparatus 40 finds the original data block in the cache memory 42 rather than reading the original data block from the disk storage 44 as second time. Accordingly, there is greater efficiency and less latency.

In step 212, the electronic apparatus 40 updates the original data block in the cache memory 42 with the new data of the write instruction 28. Eventually, the modified data block may be synchronized to the disk storage 44 and the mirroring assembly 24(M) (also see FIGS. 1 and 2).

As mentioned above, an improved technique for handling CoFW data 50 for snapshot purposes involves locating CoFW data 50 in cache memory 42 (e.g., in the file system buffer cache using a standard hashing mechanism) and simply copying the CoFW data 50 from the cache memory 42 to a save area for snapshot purposes. That is, the technique involves quickly identifying the CoFW data 50 in the file system buffer cache and passing the CoFW data 50 from the file system buffer cache to the snapshot save area 46. Such operation eliminates the extra IO (i.e., reading the CoFW data 50 from disk storage 44) by leveraging off of user access patterns and the file system buffer cache. Moreover, such operation achieves better snapshot throughput and does not compromise data consistency.

While various embodiments of the present disclosure have been particularly shown and described, it will be understood by those skilled in the art that various changes in form and details may be made therein without departing from the spirit and scope of the present disclosure as defined by the appended claims.

The invention claimed is:

1. In an electronic apparatus having cache memory, a method of performing a write operation, the method comprising:
after a snapshot of a file system is taken, receiving a write instruction to write new data to a particular portion of the file system;
in response to the write instruction, reading metadata to determine whether the new data is a first update of the particular portion of the file system since the snapshot was taken, the metadata being constructed and arranged to identify portions of the file system which have changed since the snapshot was taken;
when the metadata indicates that the new data is not a first update of the particular portion of the file system since the snapshot was taken, updating original data in the cache memory with the new data, the original data corresponding to the particular portion of the file system; and
when the metadata indicates that the new data is a first update of the particular portion of the file system since the snapshot was taken, copying the original data from the cache memory to snapshot storage which is separate from the cache memory and, after the original data is copied from the cache memory to the snapshot storage, updating the original data in the cache memory with the new data;
wherein the portions of the file system are data blocks;
wherein the metadata includes a first update table having a set of first update entries, each first update entry corresponding to a respective data block of the file system;
wherein the write instruction identifies a particular data block; and
wherein reading the metadata to determine whether the new data is a first update of the particular portion of the file system since the snapshot was taken includes reading, from the first update table, contents of a particular first update entry corresponding to the particular data block identified by the write instruction, the new data (i) not being a first update of the particular portion of the file system since the snapshot was taken when the contents of the particular first update entry define a first value, and (ii) being a first update of the particular portion of the file system since the snapshot was taken when the contents of the particular first update entry define a second value which is different than the first value.

2. A method as in claim 1 wherein the metadata further includes a pointer table having a set of pointer entries, each pointer entry corresponding to a respective data block of the file system; and wherein the method further comprises:
in response to copying the original data from the cache memory to the snapshot storage, storing a pointer in a particular pointer entry corresponding to the particular data block identified by the write instruction, the pointer being an address of the snapshot storage which stores the original data copied from the cache memory.

3. A method as in claim 2, further comprising:
after the snapshot of the file system is taken and prior to receiving the write instruction, receiving a read instruction which identifies the particular data block; and
copying the original data from disk storage into the cache memory in response to the read instruction.

4. A method as in claim 2 wherein the write instruction identifies a read-modify-write operation; and wherein the method further comprises:
copying the original data from disk storage into the cache memory in response to the write instruction.

5. A method as in claim 2 wherein copying the original data from the cache memory to snapshot storage includes:
refraining from modifying the original data in the cache memory while the original data is copied to the snapshot storage and enabling modification of the original data in the cache memory only after the original data is fully copied to the snapshot storage.

6. A method as in claim 2 wherein the electronic apparatus having the cache memory is electronically coupled to another apparatus which is constructed and arranged to mirror the file system; and wherein the method further comprises:
directing the other electronic apparatus to process the write instruction to replicate the new data at the other electronic apparatus.

7. A method as in claim 2, further comprising:
receiving a snapshot command, and
in response to the snapshot command and prior to receiving the write instruction, creating (i) a snapshot bitmap as the first update table, (ii) a snapshot blockmap as the pointer table, and (iii) a SavVol memory structure as the snapshot storage.

8. A method as in claim 7 wherein copying the original data from the cache memory to the snapshot storage includes:
reading the original data from the cache memory and storing the original data as Copy on First Write (CoFW) data in the SavVol memory structure.

9. A method as in claim 8 wherein reading the original data from the cache memory includes:
performing an efficient hashing operation to locate the CoFW data within the cache memory to avoid re-reading the CoFW data from disk storage.

10. A method as in claim 8 wherein the file system represents a source volume at the time the snapshot of the file system is taken; and wherein the method further comprises:
after the CoFW data is stored in the SavVol memory structure, receiving a roll back command; and
in response to the roll back command, copying the CoFW data from the SavVol memory structure to the cache memory to restore the source volume.

11. A method as in claim 8 wherein the electronic apparatus is a storage server;
wherein the write instruction originates from a host device which stores data into and loads data from the storage server through a network; and
wherein the snapshot command and the roll back command originate from an administration device which is separate from the electronic apparatus and the host device.

12. An electronic apparatus, comprising:
cache memory;
snapshot storage which is separate from the cache memory; and
a control circuit coupled to the cache memory and the snapshot storage, the control circuit being constructed and arranged to:
after a snapshot of a file system is taken, receive a write instruction to write new data to a particular portion of the file system,
in response to the write instruction, read metadata to determine whether the new data is a first update of the particular portion of the file system since the snapshot was taken, the metadata being constructed and arranged to identify portions of the file system which have changed since the snapshot was taken,
when the metadata indicates that the new data is not a first update of the particular portion of the file system since the snapshot was taken, update original data in the cache memory with the new data, the original data corresponding to the particular portion of the file system, and when the metadata indicates that the new data is a first update of the particular portion of the file system since the snapshot was taken, copy the original data from the cache memory to the snapshot storage and, after the original data is copied from the cache memory to the snapshot storage, update the original data in the cache memory with the new data;

wherein the portions of the file system are data blocks;

wherein the metadata includes a snapshot bitmap having a set of bitmap entries, each bitmap entry corresponding to a respective data block of the file system;

wherein the write instruction identifies a particular data block; and wherein the control circuit, when reading the metadata to determine whether the new data is a first update of the particular portion of the file system since the snapshot was taken, is constructed and arranged to read, from the snapshot bitmap, contents of a particular bitmap entry corresponding to the particular data block identified by the write instruction, the new data (i) not being a first update of the particular portion of the file system since the snapshot was taken when the contents of the particular bitmap entry define a first value, and (ii) being a first update of the particular portion of the file system since the snapshot was taken when the contents of the particular bitmap entry define a second value which is different than the first value.

13. An electronic apparatus as in claim 12 wherein the metadata further includes a snapshot blockmap having a set of blockmap entries, each blockmap entry corresponding to a respective data block of the file system; and wherein the control circuit is further constructed and arranged to:

in response to copying the original data from the cache memory to the snapshot storage, store a pointer in a particular blockmap entry corresponding to the particular data block identified by the write instruction, the pointer being an address of the snapshot storage which stores the original data copied from the cache memory.

14. A computer program product which includes a non-transitory computer readable medium storing containing code to perform a write operation, the code directing a computerized device to:

receive, after a snapshot of a file system is taken, a write instruction to write new data to a particular portion of the file system;

in response to the write instruction, read metadata to determine whether the new data is a first update of the particular portion of the file system since the snapshot was taken, the metadata being constructed and arranged to identify portions of the file system which have changed since the snapshot was taken;

when the metadata indicates that the new data is not a first update of the particular portion of the file system since the snapshot was taken, update original data in cache memory with the new data, the original data corresponding to the particular portion of the file system; and when the metadata indicates that the new data is a first update of the particular portion of the file system since the snapshot was taken, copy the original data from the cache memory to snapshot storage and, after the original data is copied from the cache memory to the snapshot storage, update the original data in the cache memory with the new data;

wherein the portions of the file system are data blocks;

wherein the metadata includes a snapshot bitmap having a set of bitmap entries, each bitmap entry corresponding to a respective data block of the file system;

wherein the write instruction identifies a particular data block; and wherein reading the metadata to determine whether the new data is a first update of the particular portion of the file system since the snapshot was taken includes reading, from the snapshot bitmap, contents of a particular bitmap entry corresponding to the particular data block identified by the write instruction, the new data (i) not being a first update of the particular portion of the file system since the snapshot was taken when the contents of the particular bitmap entry define a first value, and (ii) being a first update of the particular portion of the file system since the snapshot was taken when the contents of the particular bitmap entry define a second value which is different than the first value.

15. An electronic apparatus as in claim 14 wherein the metadata further includes a snapshot blockmap having a set of blockmap entries, each blockmap entry corresponding to a respective data block of the file system; and wherein the control circuit is further constructed and arranged to:

in response to copying the original data from the cache memory to the snapshot storage, store a pointer in a particular blockmap entry corresponding to the particular data block identified by the write instruction, the pointer being an address of the snapshot storage which stores the original data copied from the cache memory.

* * * * *